United States Patent [19]
Swick

[11] Patent Number: 5,852,859
[45] Date of Patent: Dec. 29, 1998

[54] METHOD AND APPARATUS FOR MAKING PISTON RINGS

[76] Inventor: E. Grant Swick, 28W629 Stearns Rd., Bartlett, Ill. 60103-6528

[21] Appl. No.: 48,973

[22] Filed: Mar. 26, 1998

Related U.S. Application Data

[62] Division of Ser. No. 577,058, Dec. 22, 1995.

[51] Int. Cl.[6] ................................................ B23B 11/00
[52] U.S. Cl. ..................... 29/34 R; 29/412; 29/888.073; 29/888.07; 72/129; 140/88; 470/42
[58] Field of Search .................................. 29/33 F, 34 R, 29/412, 888.07, 888.073; 72/129; 140/88; 470/42

[56] References Cited

U.S. PATENT DOCUMENTS

| | | | |
|---|---|---|---|
| 1,018,149 | 2/1912 | Wright | 29/888.07 |
| 1,450,346 | 4/1923 | Anderson | 29/888.07 |
| 1,989,750 | 2/1935 | Garrett | 470/42 |
| 2,279,133 | 4/1942 | Cross | 266/109 |
| 2,467,414 | 4/1949 | Wilkening | 29/888.07 |
| 2,688,346 | 9/1954 | England | 140/88 |
| 2,748,453 | 6/1956 | Haldeman | 29/888.07 |
| 3,778,877 | 12/1973 | Walker | 29/412 |
| 4,020,878 | 5/1977 | Yashiro | 140/88 |
| 4,856,105 | 8/1989 | Brocksieper et al. | 364/474.02 |
| 5,676,008 | 10/1997 | Morin | 72/129 |

FOREIGN PATENT DOCUMENTS

| | | | |
|---|---|---|---|
| 858523 | 11/1940 | France | 29/888.07 |
| 601235 | 8/1934 | Germany | 72/129 |
| 1-224567 | 9/1989 | Japan | 29/888.07 |

*Primary Examiner*—Andrea L. Pitts
*Assistant Examiner*—Christopher Kirkman
*Attorney, Agent, or Firm*—James E. Brunton

[57] ABSTRACT

A method and apparatus for making non-circular piston rings which will precisely sealably conform to the cylinder wall of an internal combustion engine. In accordance with the method of the invention a metal strip of special cross-sectional configuration is coiled about a specially configured mandrel which is non-circular in cross section. Preferably the coiling mandrel is provided with a circumferentially interrupted thread form that has a zero helix angle along most of its circumference. During the coiling operation, using this type of mandrel, the metal strip is preformed at specific locations along its length into an angled configuration to form a coil body having a plurality of coils that have a zero helix angle along most of their circumference and a relatively steep helix angle for a short distance. After the coil is formed, the helix angle portions are cut therefrom to provide a plurality of generally planer, interrupted rings.

6 Claims, 6 Drawing Sheets

METHOD AND APPARATUS FOR MAKING PISTON RINGS

This is a divisional application of U.S. Ser. No. 08/577,058 Dec. 22, 1995 abandoned.

BACKGROUND OF THE INVENTION

1. Field of the Invention

The present invention relates generally to a method and apparatus for making rings. More particularly, the invention concerns a method and apparatus of making piston rings for internal combustion engines.

2. Discussion of the Invention

Piston rings of the character used in internal combustion engines are generally formed from metal by a process which typically includes a number of steps, such as casting the metal into rough shape and then cleaning, cutting, machining, chemically treating, and finishing the casting to form the finished piston ring. This type of process is typically expensive, inefficient, and extremely labor intensive.

A number of attempts have been made in the past to develop methods for making piston rings which are more efficient, less expensive, and which produce piston rings of higher quality than those made of conventional casting processes. For example, U.S. Pat. No. 2,279,133 issued to Cross describes a method for making piston rings from wire by heating the wire and then winding the heated wire onto a cooled mandrel to produce a body of helical formation. The helical body is then cut up into individual rings and the helical rings thus produced are trued to a flat form.

Another prior art method for making piston rings from wire is described in U.S. Pat. No. 2,748,453 issued to Haldeman. The Haldeman process involves bending a metallic strip to form a ring, placing the ring on a mandrel having an exterior surface substantially identical to the desired form of the inner surface of the ring, applying radially inwardly directed forces to the ring to secure the ring to the mandrel and then heating the ring to relieve any internal stresses which have been formed therein. The ring formed by the Haldeman process is moderately non-circular and expands to seal a piston cylinder more efficiently than the traditional circular shaped piston rings. Such a non-circular ring is also disclosed in the very old U.S. Pat. No. 1,292,633 issued to Norman.

U.S. Pat. No. 4,937,937 issued to Bruce also describes a method of making piston rings of a non-circular configuration from a metal strip. In accordance with the Bruce method, a metal strip is fed into a guide means to align the strip and feed it into a first bending means wherein the strip is bent into a regular curve of a predetermined radius. The curved strip is then fed into a second bending means to increase the radii of curvature of all of the constituent portions of the strip to form the ring to the predetermined, non-circular profile.

Currently some piston ring manufacturers use pre-heat treated material which is wound upon a conventional spring-making machine such as rotating or fixed curling tools to form a helical body. The helical body is then cut to make generally round, helical rings which are trued to plane in a clamping device that removes the helix.

The thrust of the present invention is to provide a highly novel method and apparatus for producing high quality piston rings at a significantly lower overall cost than those produced by known prior art processes. As will be better understood from the discussion which follows, this is accomplished by winding an elongated metal strip of a special configuration onto a mandrel of unique design which is non-circular in cross section.

SUMMARY OF THE INVENTION

It is an object of the present invention to provide a novel method and apparatus for making a non-circular piston ring which will precisely sealably conform to the cylinder wall of an internal combustion engine.

Another object of the invention is to provide a method for making a piston ring of the aforementioned character in which a metal strip of special cross-sectional configuration is coiled about a specially configured mandrel which is a non-circular in cross section.

Another object of the invention is to provide a method and apparatus as described in the preceding paragraphs in which the metal strip is coiled about a special mandrel having a thread form that has a zero helix angle along most of its circumference or perimater and then a relatively steep helix angle for a short distance.

Another object of the invention is to provide a method and apparatus for making a piston ring in which a metal strip is coiled about a specially configured, non-circular mandrel which is provided with a thread form having a zero helix angle that is interrupted by a longitudinally extending slot having a width generally corresponding to the desired gap to be provided in the piston ring.

Another object of the invention is to provide a method a described in the preceding paragraph in which, during the coiling operation, the metal strip is formed at specific locations along its length into angled configurations.

Another object of the invention is to provide a method as described in the preceding paragraph in which, following the forming and coiling operation, the metal strip is cut to remove the angled portions of the strip to form a plurality of substantially planar shaped, split rings of a non-circular configuration.

Another object of the invention is to provide a method as described herein in which following the coiling operation the metal strip is heat treated, tempered and nitrided as may be required.

DESCRIPTION OF THE INVENTION

Figure 1:
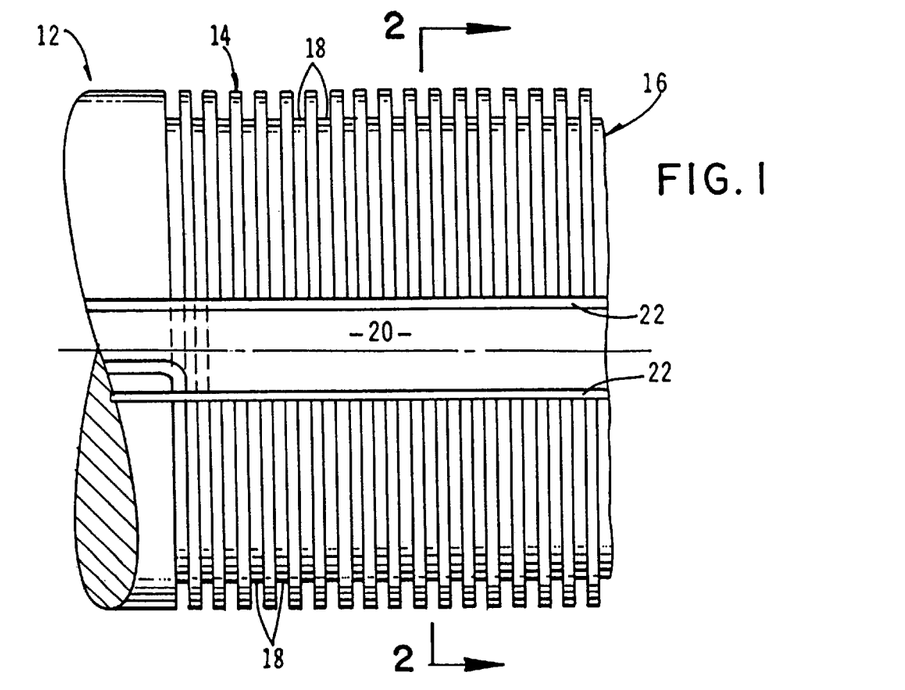
FIG. 1 is a fragmentary, side-elevational view of one form of the coiling mandrel of the apparatus of the present invention.
Figure 2:
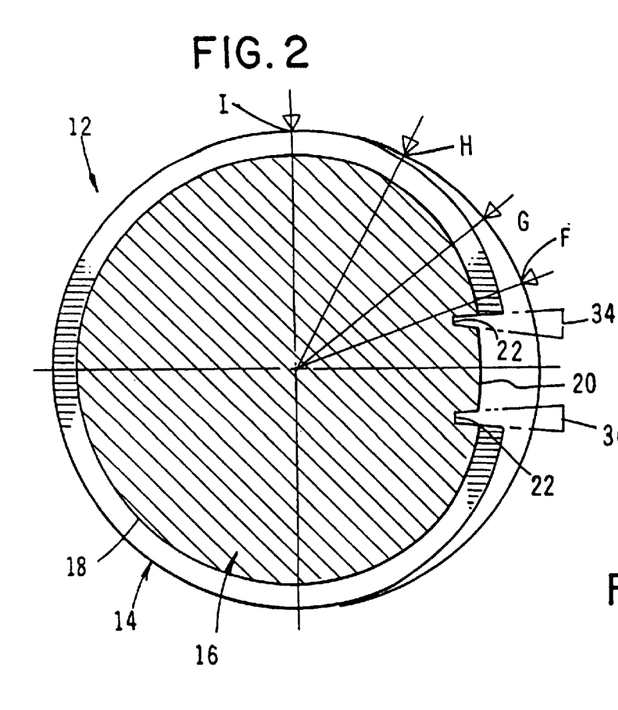
FIG. 2 is a cross-sectional view taken along lines 2—2 of FIG. 1.
Figures 2A, 3, 7:
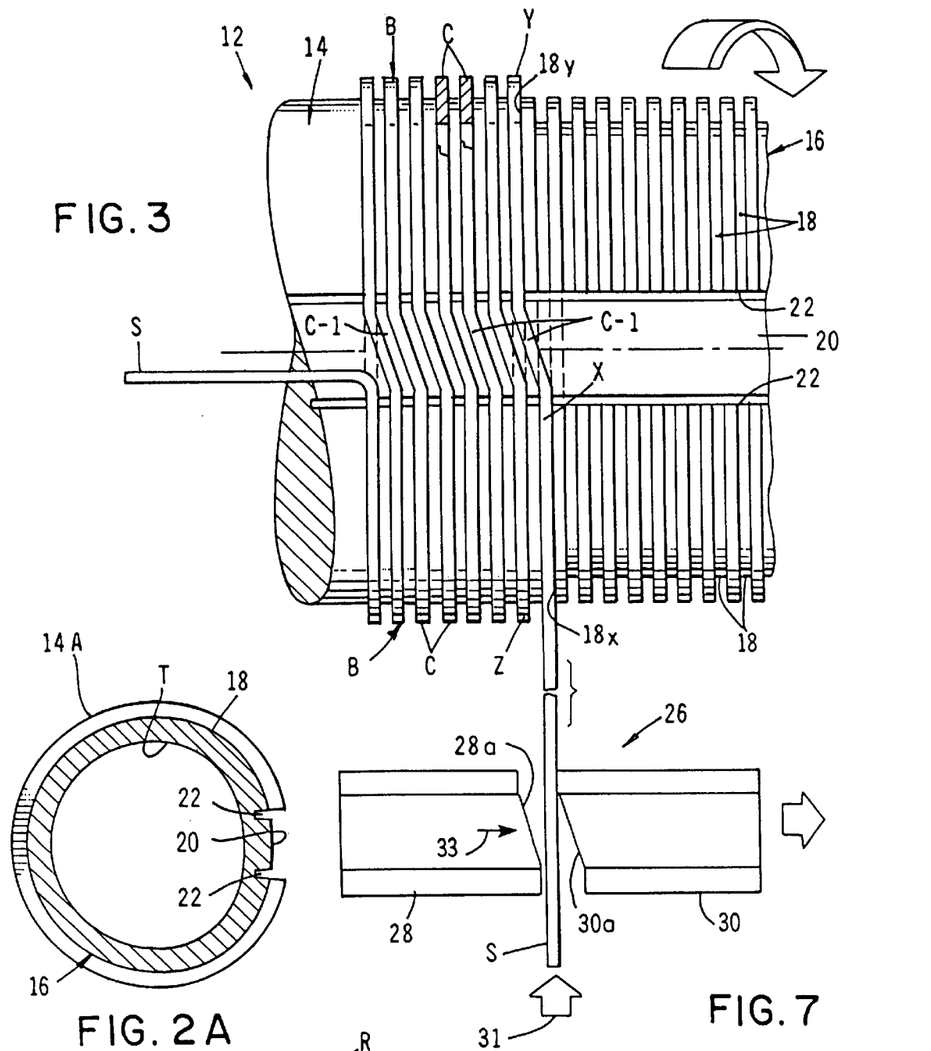
FIG. 2A is a cross-sectional view of an alternate form of coiling mandrel of the invention.
FIG. 3 is a fragmentary, side-elevational view similar to FIG. 1, but showing the step of coiling a specially configured metal strip onto the coiling mandrel.
FIG. 7 is a generally perspective, fragmentary view of the helix angle segment of one coil of the coiled body shown in FIG. 3 after it has been cut from the coiled body to form the split ring shown in FIG. 6.

Referring to the drawings and particularly to FIGS. 1, 2, and 3, one form of the apparatus of the invention for making interrupted rings is there shown and generally designated by the numeral 12. As best seen in FIG. 1, the apparatus of this form of the invention, comprises a forming mandrel 14 having a body portion 16 which, as shown in FIG. 2, is non-circular in cross section. Body portion 16 is provided with a plurality of longitudinally spaced-apart, circumferentially extending grooves 18. As indicated in FIGS. 1 and 2, each groove 18 is interrupted along its circumference by an interruption generally designated by the numeral 20. Coinciding with interruption 20 is a pair of longitudinally extending, cutting tool receiving channels 22, the purpose of which will presently be described.

Turning to FIG. 3, wherein one form of the method of the invention is illustrated, it is to be noted that an elongated metal strip "S" is coiled around mandrel 14 to form a body "B" that is made up of a plurality of circumferentially extending coils "C". Coils "C" have a generally zero helix angle along a major portion of their circumference and a helix angle segment "C-1" along a minor portion of their circumference which corresponds generally to interruption 20. In one form of the method of the invention, the helix angle segments "C-1" of the coils "C" are formed by forming means generally designated in FIG. 3 by the numeral 26. Forming means 26 is here shown as a pair of cooperating forming members 28 and 30 each of which has a strategically angled face 28a and 30a respectively which generally corresponds to the angle of helix angle segments "C-1".

In accomplishing the form of the method of the invention illustrated in FIG. 3, the metal strip "S" is continuously advanced between forming members 28 and 30 in the direction of the arrow 31. As the metal strip advances, member 28 is periodically moved in the direction of the arrow 33 toward member 30 so as to engage a segment of the metal strip "S" and form in the metal strip the helix angle shaped segments "C-1". It is to be understood that segments "C-1" are formed by the forming means at strategic locations along the length of strip "S" so that as the strip is wound about mandrel body 16 in the manner shown in FIG. 3, helix angle segments "C-1" will be located within interruption 20 and intermediate cutting tool receiving channels 22. Forming means 26 is of a character well known to those skilled in the art and can be readily constructed and operated by those skilled in the art such as skilled tool and die makers.

Since grooves 18 are formed in mandrel body 16 with a zero helix angle, the portions of the grooves located on opposite sides of interruption portion 20 will be aligned. As the metal strip is coiled about mandrel 14, it is to be observed that a portion of the coil being fed onto the mandrel and generally designated as X will reside in a groove designated in FIG. 3 by the numeral 18x. However, because of the angled segment formed in the metal strip by the forming means, continued winding of the strip will result in a coil portion designated in FIG. 3 as Y being received into a groove designated as 18y which is offset by one groove from groove 18x. With this novel arrangement, it is to be noted that, a previously wound coil segment, which is designated in FIG. 3 as Z, will be in alignment with coil portion Y. Accordingly, when the individual coils are cut by cutting means such as the cutters 34 and 36, which are shown in phantom lines in FIG. 2, a plurality of interrupted rings "R" having the general configuration shown in FIG. 6 will be formed. Importantly because coiling mandrel 14 is non-circular in cross section, the body portion RB of each ring of "R" will also be non-circular and will include spaced-apart end portions "RE" which are formed by the removal of the segment "CC" shown in FIG. 7.

Cutting means or cutting elements 34 and 36 are of a character well known to those skilled in the art and have cutting extremities which, during the cutting operation, will be closely received within cutting tool receiving channels 22 in the manner indicated in FIG. 2. As each coil is cut, the helix angle segments "C-1" will be removed from the coil body to form angled segments "CC" of the configuration shown in FIG. 7. Once again, those skilled in the art will find no difficulty in constructing cutting means which embody the cutting elements 34 and 36 and which include means for moving these cutting elements into cutting engagement with the coil body "B".

Figure 4:
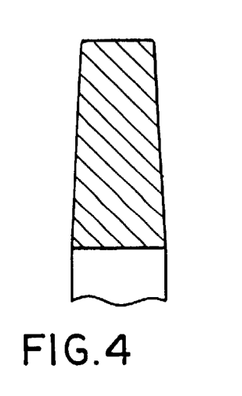
FIG. 4 is a fragmentary, cross-sectional view of one form of the metal strip used to produce the split ring of the invention.
Figure 5:
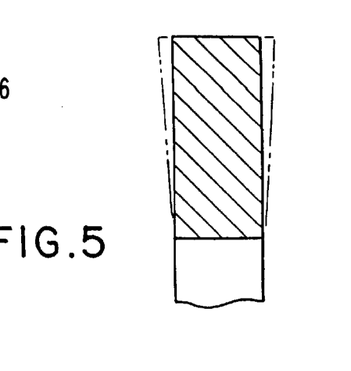
FIG. 5 is a fragmentary, cross-sectional view illustrating in phantom lines the starting cross-sectional configuration of the metal strip and in solid lines the finished cross-sectional view of the metal strip after coiling about the coiling mandrel.

As can be observed by referring to FIGS. 2 and 3, when the metal strip "S" is coiled about the mandrel, the distance around the outside of the coil which is formed is greater than the distance around the inside thereof. This being the case, if the cross section of the strip "S" used to form the coil were generally rectangular as shown by the solid lines in FIG. 5, the cross section of the strip after coiling would exhibit tapered walls of the character shown in FIG. 4. This resulting thinning of the coil is undesirable when the coil is cut to form the finished piston ring and, therefore, the strip of starting material "S" is uniquely formed with a cross-sectional configuration of the character illustrated by the phantom lines in FIG. 5. More particularly, the strip is initially formed so that it is somewhat thicker along the portion of the strip that ultimately forms the outside diameter portion of the interrupted ring. By winding a strip having the cross-sectional configuration shown by the phantom lines in FIG. 5, the coils which are formed during the coiling step will be thinned to produce coils having the cross-sectional configuration shown by the solid lines in FIG. 5. As a result, the interrupted rings which are produced by cutting the coils will also have the optimal cross-sectional configuration shown by the solid lines in FIG. 5.

Figure 6:
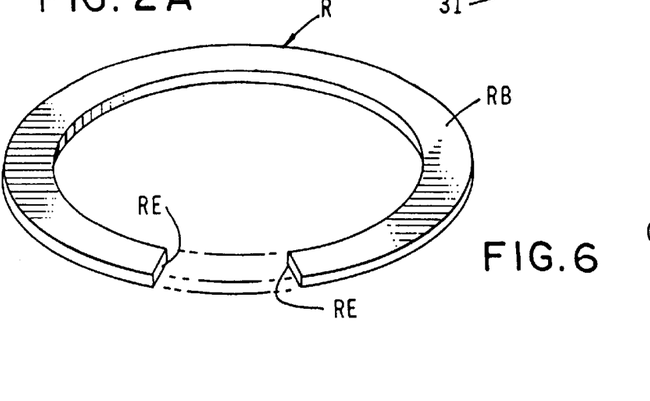
FIG. 6 is a generally perspective view of one form of split ring produced by the method of the invention.

Turning once again to FIGS. 2 and 6, it is to be noted that the piston ring produced by the method of the invention is provided with a significant gap between ends "RE" of the interrupted ring. When the piston ring is installed on the piston and the piston is installed in the cylinder bore, the gap between ends "RE" should be minimal and normally on the order of less than 0.005 inches. Thus, as shown in FIG. 6, the ring must be substantially compressed when it is installed into the cylinder block. It is, of course, apparent that, if the interrupted ring were a true circle, the corners of the ring would tend not to compress as readily as the main body of the ring and thus have a tendency to dig into the cylinder wall of the engine. As previously discussed herein, this problem is uniquely solved by constructing the body portion 16 of the mandrel in the non-circular configuration generally shown in FIG. 2. More particularly, as diagrammatically shown in FIG. 2, the outside radius of curvature of the mandrel is gradually decreased from point I through points H, G and F to form the generally oval shaped outside curvature of the mandrel as shown by the darker lines in FIG. 2. One technique for generating a desired oval shape contour of an article is described in previously identified in U.S. Pat. No. 1,292,633 issued to Norman. Therefore, this patent is hereby incorporated by reference as though fully set forth herein. Following the teachings of this patent as well as various similar techniques well known in the art, construction of a non-circular generally oval shaped cross-sectional mandrel 14 of the character shown in FIG. 2 can be achieved without difficulty.

In accordance with the method of the invention, when metal strip "S" is tightly coiled about the strategically formed mandrel, the radius of curvature of each coil at a location proximate interruption 20 is generally equal to the radius of the cylinder bore of the engine. Accordingly, when a piston ring which is constructed in accordance with the method of the invention is installed on a piston and the piston is, in turn, installed within the cylinder block, the piston ring of the invention will make intimate contact with the cylinder wall along its entire circumference less the small gap referred to earlier.

In certain instances it is desirable to use a hollow coiling mandrel of the character shown in FIG. 2A and generally designated as 14A. Mandrel 14A is identical in construction to mandrel 14 save that it is provided with a central, longitudinal bore "B". The use of a hollow mandrel facilitates air quenching the entire assembly during the quenching step.

Figure 8:
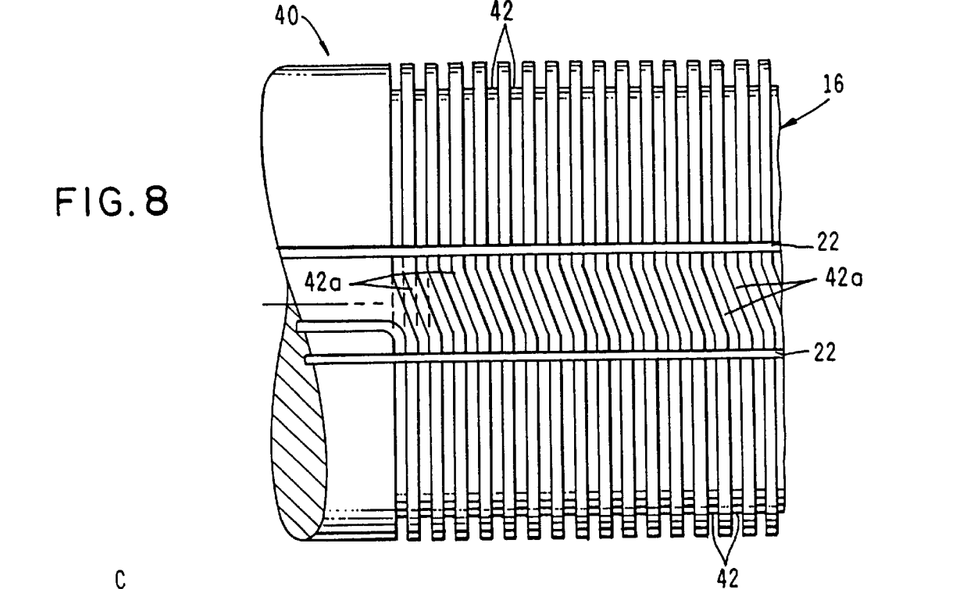
FIG. 8 is a fragmentary, side-elevational view of another form of coiling mandrel of the present invention.
Figures 9, 9A:
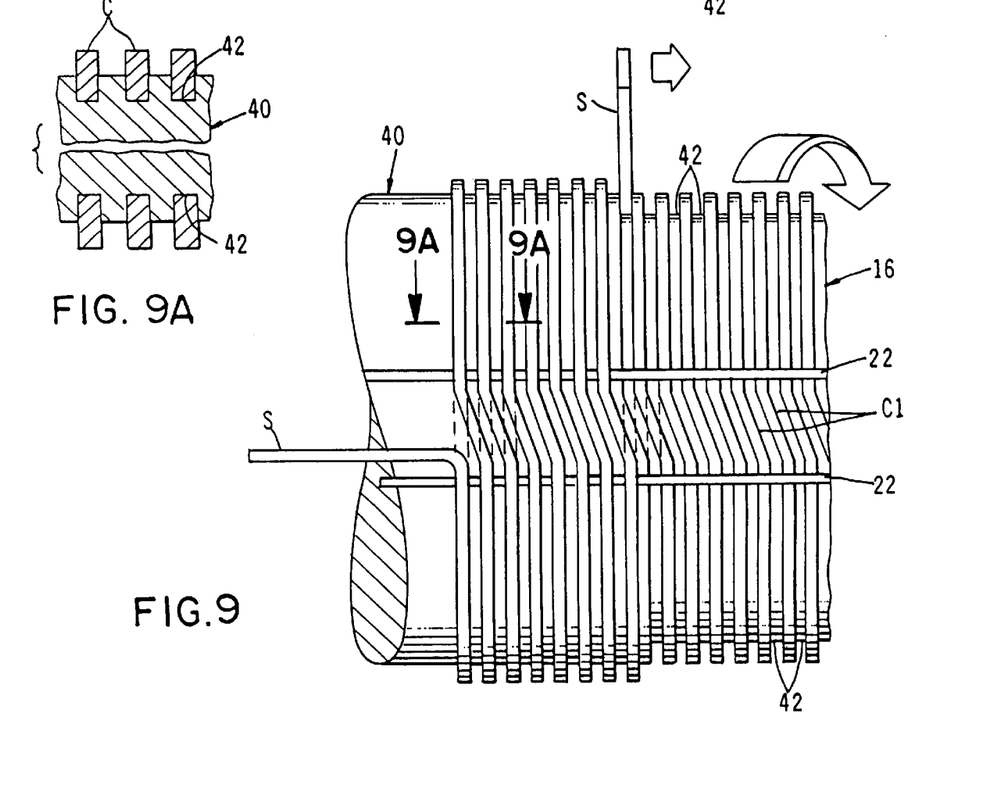
FIG. 9 is a fragmentary, side-elevational view similar to FIG. 8 but showing a metal strip having been coiled about the coiling mandrel of FIG. 8.
FIG. 9A is a cross-sectional view taken along lines 9A—9A of FIG. 9.

Turning next to FIGS. 8, and 9 and 9A, an alternate form of coiling mandrel of the invention is there illustrated. This mandrel is somewhat similar in construction to previously described mandrel 14 and like numbers are used to designate like elements. This latest form of coiling mandrel, which is generally designated by the numeral 40, includes a plurality of circumferentially extending, transversely spaced-apart grooves 42 which have a generally zero helix angle along a major portion of their circumference. However, in the form of the invention shown in FIG. 8, each of the grooves 42 also includes a helix angle shaped portion designated in FIG. 8 by the numeral 42a. With this construction, as the metal strip "S", which is of the starting configuration previously described, is wound about the mandrel in the manner shown in FIG. 9, the metal strip will conform to the shape of the grooves formed in the mandrel and the helix angle portions 42a thereof will automatically cause formation of helix angle segments "C-1" of the character previously described. This being the case, segments "C-1" rather than being formed by the forming means 26 shown in FIG. 3 will be formed by the helix angle portions 42a of grooves 42 as the metal strip is tightly wound about the mandrel. As indicated in FIG. 9A, as before, each of the coils "C" has a generally zero helix angle along the major portion of their circumference and each has the helix angle segment "C-1" formed along a minor portion of the circumference by the helix angle groove portions 42a.

As in the earlier form of the invention, cutting tool receiving channels 22 are formed in mandrel 40 and, as before, function to receive cutting tools 34 and 36 of the character previously described. As the various coils are cut by the cutting means, interrupted rings having the general character shown in FIG. 6 will once again be formed. Because mandrel 40, like mandrel 14 is non-circular in shape, the interrupted rings formed using this second form of the apparatus of the invention will be of identical construction and operation to those previously described herein.

Figures 10, 10A:
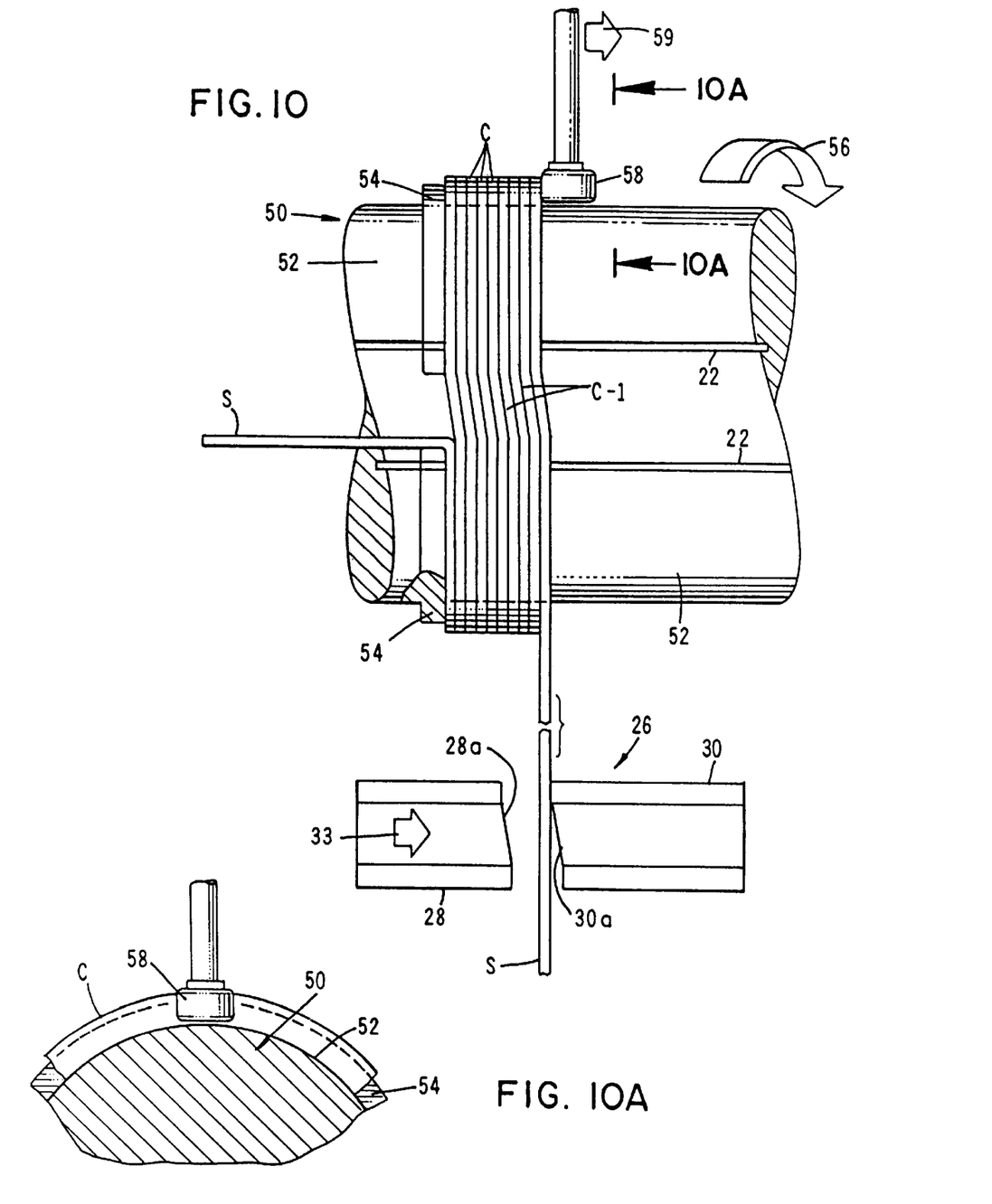
FIG. 10 is a side-elevational view of yet another form of the apparatus of the invention for forming split rings.
FIG. 10a is a cross-sectional view taken along lines 10A—10A of FIG. 10.

Turning next to FIGS. 10 and 10A, yet another form of apparatus of the present invention is there illustrated. This form of the apparatus is also similar to that previously described, but, includes an oval shaped or non-circular mandrel 50 having a smooth non-grooved outer surface 52 of the character shown in FIGS. 10 and 10A. The apparatus of this latest form of the invention also includes forming means 26 which means are identical to and function in precisely the same way as those earlier described herein. The forming means 26 must coin or slightly reduce the stock thickness in the stepped area in order to maintain the steps in an axial alignment. Once again, like numerals are used to identify like elements of the mandrel and of the forming means. As was earlier the case, the forming means function to form helix angle sections "C-1" at periodic intervals along the length of the metal strip (FIG. 10). In accomplishing the method of the invention using the apparatus shown in FIGS. 10 and 10A, the specially configured metal strip "S" is first bent over a backing ring 54 which is provided on mandrel 50 and extends radially outwardly from surface 52 thereof. Next mandrel 50 is rotated in the direction of the arrow 56 to commence the coiling step. During coiling, one or more rollers 58 engage the coils "C" of the metal strip as the coils are formed and thereby maintain the squareness of the individual coils during the coiling step. As indicated by the arrow 59 in FIG. 10, rollers 58 progressively move longitudinally of mandrel 50 as the coiling process continues.

Once again, mandrel 50 is provided with longitudinally extending cutting tool receiving grooves 22 which receive cutting tools 34 and 36 of the character previously described and shown in FIG. 2. As before, after the coil "C" are cut by the cutting means, interrupted rings of the configuration shown in FIG. 6 will be formed. Because of the non-circular, cross-sectional configuration of mandrel 50, the rings thus formed will be non-circular and, in the manner previously described will closely conform to the cylinder wall of the engine after the rings have been installed on a piston and the piston installed in the cylinder block.

Figures 11, 12, 13:
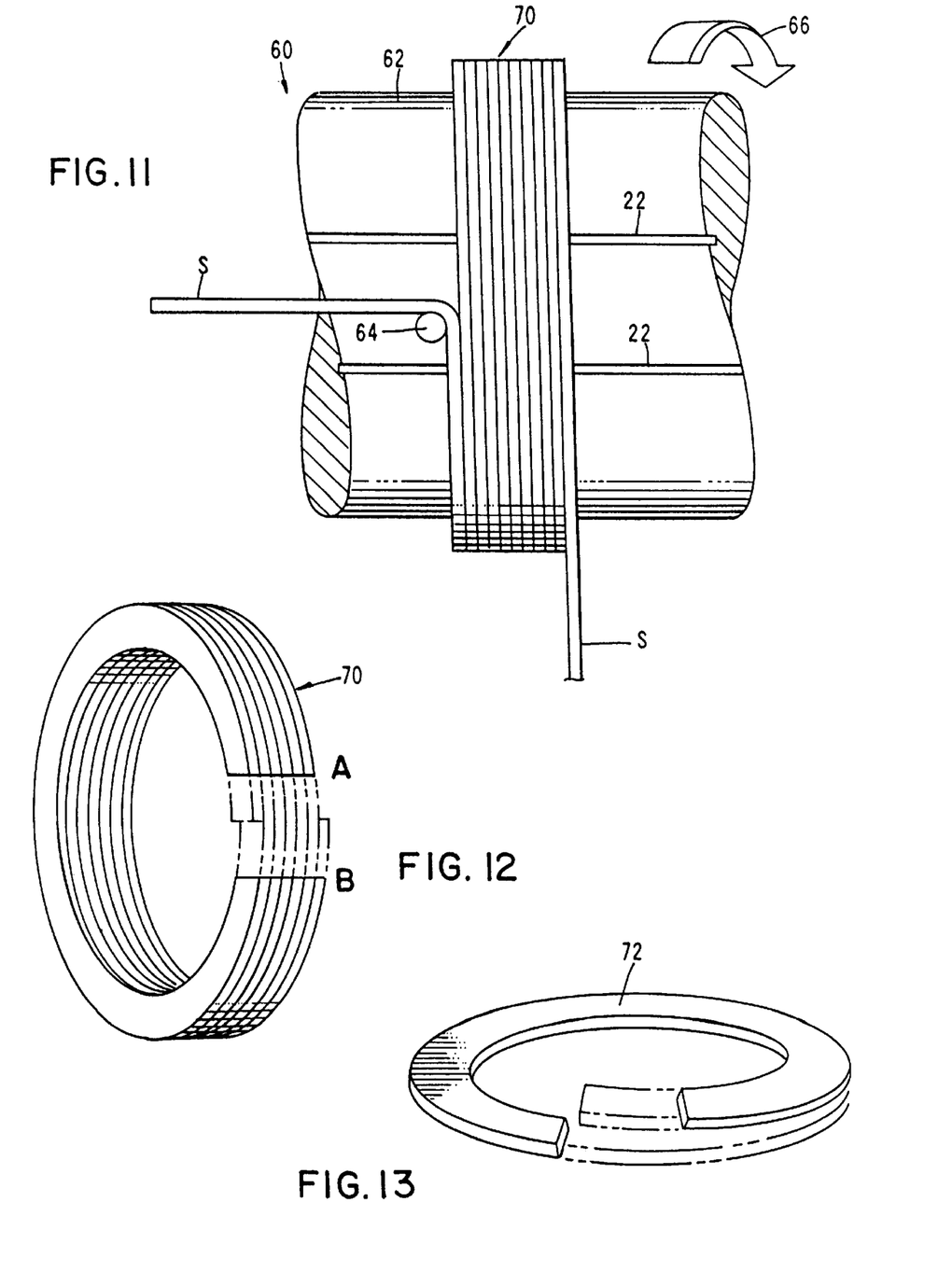
FIG. 11 is a side-elevational view of still another form of the apparatus of the present invention.
FIG. 12 is a generally perspective view of a coiled body produced by winding a metal strip about the mandrel shown in FIG. 11.
FIG. 13 is a generally perspective view of a split ring formed by cutting one coil of the coiled body shown in FIG. 12.

Turning to FIGS. 11, 12 and 13, still another form of the apparatus of the present invention is there illustrated. This form of the apparatus of the invention is similar in some respects to that shown in FIGS. 10 and 10A and includes a mandrel 60 which is non-circular in cross section and is provided with a pair of longitudinally cutting tool receiving grooves 22 of the character previously described. As was the case with the apparatus shown in FIG. 10, mandrel 60 does not include winding grooves but rather is provided with a generally oval shaped surface 62 about which the strip of metal "S" is tightly wound. In accomplishing the method of the invention using the apparatus shown in FIG. 11, the metal strip "S" is first bent over a starting pin 64 which extends outwardly from surface 62 of mandrel 60. Following bending the strip "S" over pin 64, strip "S" is then pulled on edge from a coil (not shown) and wound around the mandrel by rotation of the mandrel in the direction of the arrow 66. Preferably a "prony break" or a similar device is employed in order to keep the strip taut during the coiling process. After a number of coils have been wound about the mandrel, the coil body 70 thus formed can be cut in the manner previously described using cutting means of the character shown in FIG. 2 which comprise cutting elements 34 and 36. Alternatively, the coil body 70 having the general appearance shown in FIG. 12 can be slid from the mandrel. Coil body 70 can then be cut along lines designated in FIG. 12 as "A" and "B" to form a plurality of interrupted rings 72 having the general configuration shown in FIG. 13. Once again, because mandrel 60 is non-circular in cross section, the interrupted rings 72 formed by cutting coil body 70 will be non-circular, but will not be planar as was the case with the interrupted rings produced in accordance with the earlier described methods of the invention. This being the case, each of the rings 72 formed by this latter method of the invention must be trued to plane by a suitable compression process of a character well known to those skilled in the art to produce a non-circular shaped, interrupted ring in which the body thereof is substantially planer.

While various metals can be used to produce the piston rings of the present invention, stainless steels that are particularly well suited for the purpose include types 420, 440A, 440B, and 440C. The specific chemical analyses of these grades of stainless are well known to those skilled in the art and are readily available from a number of technical publications. All these grades may be characterized as being hardenable (carbon content varies by grade from approximately 0.25% for 420 to approximately 1.10% for 440C) and all are relatively high chromium (approximately 13% for 420 and 17% for the 440 series). Similarly, all may be heat treated and tempered to produce a "desired" balance of hardness and ductility. By way of example, type 440C rings may be heat treated by heating the ring mandrel assembly to about 1850–1900 degrees Fahrenheit, and then quenching the heated metal in oil. For thinner sections, such as piston rings on a hollow mandrel, quenching may also be accomplished by air quenching, which typically will produce a brinell hardness well in excess of 600.

Following heat treating, the material can be suitably tempered (drawn) at various temperatures to reduce the hardness and brittleness and to increase ductility. For example, 2 hours at 1000° F. will reduce the hardness to approximately 535 brinell and increase the impact values from approximately 30 ft.-lb. as quenched to 42 ft.-lb. after tempering.

It is to be understood that the specific heat treatment and tempering procedures may be varied to suit the specific objectives of the product designer. Generally the object is to create tempered martensite with uniformly distributed carbides. In a similar manner the exact chemical analysis of the raw material may also be varied to meet particular end product requirements.

Figure 14:
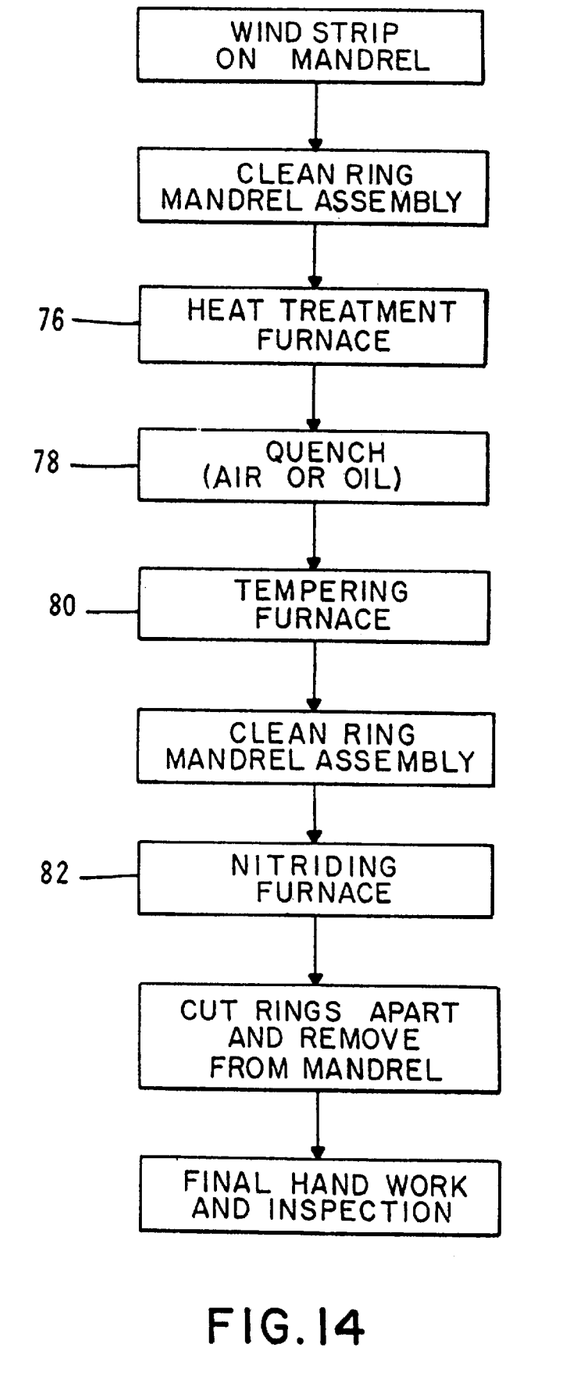
FIG. 14 is a generally, diagrammatic view identifying the various steps in one form of the method of the present invention for producing interrupted rings.

Referring finally to FIG. 14, the various steps of the method of the invention and the apparatus used to accomplish the method is there illustrated. As previously discussed herein, the first step of the method of making interrupted rings using the apparatus of the invention, comprises the step of coiling the specially configured metal ring shown by the phantom lines in FIG. 5 about the non-circular shaped mandrel. This coiling step can, of course, be accomplished using mandrels of the configuration shown in FIGS. 1, 8, 10, or 11.

After coiling has been accomplished in the manner described in the preceding paragraphs, and after a suitable length of strip is wound on the mandrel, the final end of the strip is appropriately secured to maintain the tension in the strip on the mandrel during subsequent processing, prior to cutting the rings loose. This done, the coiled body is thoroughly cleaned while it remains in position on the mandrel. Following this cleaning step, the cleaned mandrel and coil assembly is placed in a suitable heat treatment furnace 76 where, depending upon the type of metal used, the coiled body is heat treated by raising the temperature of the furnace to a range of between about 1500 degrees and 2200 degrees Fahrenheit. Following the heat treating step, the mandrel and coil assembly is then removed from the heat treatment furnace and quenched in a quenching apparatus 78. As previously mentioned, quenching can be accomplished by either oil or air quenching processes of a character well known to those skilled in the art.

Following the quenching step, the metal coil, while still in place on the mandrel can be tempered at various temperatures by placing the assemblage into a tempering furnace 80 of a character well known to those skilled in the art. Once again, tempering can be accomplished at various temperatures optimal for reducing the hardness and brittleness of the metal coil and to suitably increase the ductility of the coil.

It should be understood that the specific heat treatment and tempering procedures may be varied to suit the specific objectives of the product designer. Generally, the object of the designer is to create tempered martinsite with uniformly distributed carbides. In a similar manner, the exact chemical analysis of the raw material may also be varied.

The steps of heat treatment, quenching, and tempering with the coil in place on the mandrel, exhibits several advantages. For example, with this construction, the outer surface of the coil will quench more rapidly than the inner surface, thus desirably generating maximum hardness in areas of the coil proximate its outer surface. Since the inner surface must be stretched, both during removal of the coil from the mandrel and, after cutting the coil, to place the rings thus formed on the piston, the inner surface will advantageously exhibit greater ductility than will the outer surface. Additionally, tempering the coil on the mandrel while it is being held securely in place, will assist in maintaining the precise dimensional shape of the coil which is, of course, as dictated by the non-circular shape of the mandrel.

Following the tempering step, the coil is, once again, carefully cleaned and then, while still on the mandrel, is inserted into a nitriding furnace 82. Nitriding furnace 82 is also of a character well known to those skilled in the art and functions to controllably nitride the outer surface of each ring that makes up the coil. In this regard, due to the novel design of the mandrel, the outer surface of each ring of the coil is exposed so that nitriding advantageously occurs on the most desired surfaces of the rings, namely the surfaces that will ultimately engage the cylinder wall of the engine. The nitriding furnace and the techniques for accomplishing the nitriding step are well known to those skilled in the art and need not be discussed in detail herein.

Following the nitriding step, the mandrel and coil assembly is removed from the nitriding furnace and the individual rings which make up the coil are cut in the manner precisely described using the cutting means which comprise the previously identified cutting elements 34 and 36 (FIG. 2). Cutting of the coils, in the manner described, produces the non-circular split rings of the invention and also produces the waste segments, such as segments CC (FIG. 7). When the method of the invention is accomplished using apparatus of the character shown in FIGS. 1 through 10A, the waste segments CC have the configuration of the segment shown in (FIG. 7). On the other hand, when the interrupted rings of the invention are produced using the apparatus shown in FIGS. 11 through 13, the rings produced after cutting have the general configuration shown in FIG. 13. As previously mentioned, these rings must, of course, undergo yet another step, namely the step of compressing the rings in a manner to move the end portions thereof into a co-planar relationship.

After the interrupted rings have been formed in the manner described in the preceding paragraphs, minor final handwork can be accomplished and the interrupted rings carefully inspected to insure compliance with the required dimensional tolerances dictated by the end use which is to be made of the rings.

It is to be understood that depending upon the end use to be made of the interrupted rings of the invention, the steps of the method may vary somewhat from those described herein. For example, in certain instances, it may not be necessary to heat treat and temper the metal coil while the coil is still on the mandrel. For example, if desired, the strip metal used to form the coil can be heat treated and tempered before coiling on the mandrel. In this instance, a secondary tempering process can be used to "set" the desired shape of the rings.

In some instances, it may be necessary to accomplish additional steps in producing the desired end product. For example, for certain end product uses, it may be necessary to electroplate the exposed surface of the interrupted rings with a material such as chromium or like hard material. Uniquely the plating process can utilize a masking procedure that masks the entire coil which circumscribes the mandrel assembly. The outer surface of the mask can then be removed to expose only those surface that are to be plated. This masking and masking removal step can be easily accomplished using the apparatus of the present invention because the surface on which the mask is to be removed is readily accessible.

Additionally, titanium nitride surface coating could be applied to the metal coil produced by the method of the invention in a customary manner as, for example, through chemical vapor deposition processes accomplished in a suitable vacuum chamber.

Having now described the invention in detail in accordance with the requirements of the patent statutes, those skilled in this art will have no difficulty in making changes and modification in the individual parts or their relative assembly in order to meet specific requirements or conditions. Such changes and modifications may be made without departing from the scope and spirit of the invention, as set forth in the following claims.

I claim:

1. An apparatus for making non-circular shaped interrupted rings from an elongated metal strip comprising:

(a) a forming mandrel having a body portion which is non-circular in cross section, said body portion being provided with a plurality of circumferentially extending longitudinally spaced apart grooves, each said groove having an interruption along its circumference;

(b) coiling means for coiling the metal strip around said mandrel so that portions of the metal strip are disposed within said grooves to form a body comprising a plurality of circumferentially extending coils having a generally zero helix angle along a major portion of their circumference and a helix angle segment along a minor portion of their circumference; and (c) cutting means for cutting each coil to remove therefrom said helix angle segment.

2. An apparatus as defined in claim 1 in which said interruption in each said groove comprises an angled groove interconnecting a selected pair of circumferentially extending grooves.

3. An apparatus as defined in claim 1 in which said interruption in each said groove is formed by a longitudinally extending channel provided in said mandrel, which channel extends substantially perpendicularly to said circumferentially extending grooves.

4. An apparatus as defined in claim 3 further including forming means for forming a plurality of spaced-apart helix angle segments in the elongated metal strip.

5. An apparatus as defined in claim 3 further including means for heat treating said plurality of coils.

6. An apparatus as defined in claim 3 further including means for nitriding said plurality of coils.

* * * * *